United States Patent Office 2,693,483
Patented Nov. 2, 1954

2,693,483

PROPYNYL PHOSPHATE COMPOUNDS

Henry Tolkmith, Midland, Mich., assignor to The Dow Chemical Company, Midland, Mich., a corporation of Delaware No Drawing. Application March 6, 1952,
Serial No. 275,213

4 Claims. (Cl. 260—461)

The present invention is directed to the propynyl phosphate compounds of the formula

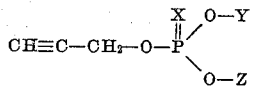

In this and succeeding formulae, X is a chalcogen, Y is a member of the group consisting of 2,4,5-trichlorophenyl and 2,4,5-trichlorophenoxyethyl and Z is a member of the group consisting of propynyl and ethyl. These compounds are oily liquids, somewhat soluble in many organic solvents and substantially insoluble in water. They are of value as intermediates for the preparation of more complex phosphorus derivatives and as toxic constituents of parasiticide compositions.

The new compounds may be prepared by reacting a dichlorophosphate of the formula

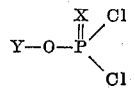

with propargyl alcohol or successively with ethyl alcohol and propargyl alcohol. The reaction is carried out in the presence of a hydrogen chloride acceptor such as triethylamine.

Where it is desired to introduce two propynyl groups into the molecule, at least 2 molecular proportions of propargyl alcohol and at least 2 molecular proportions of triethylamine are dissolved in an organic solvent such as diethyl ether and the resulting solution reacted portionwise with one molecular proportion of the dichlorophosphate reagent dissolved in diethyl ether. The reaction is carried out with stirring and at a temperature of from 20° to 35° C. The reaction is somewhat exothermic and the temperature may be controlled by regulation of the rate of contacting the reactants as well as by the addition and subtraction of heat, if required. Following the reaction, the reaction mixture is filtered to separate triethylamine hydrochloride. The solvent is thereafter recovered from the filtrate by fractional distillation under reduced pressure to obtain the desired product in substantially quantitative yield.

Where it is desired that the substituting groups differ, 1 molecular proportion of ethyl alcohol and at least 1 molecular proportion of triethylamine are dissolved in diethyl ether and the resulting solution reacted portionwise with 1 molecular proportion of the dichlorophosphate reagent dissolved in diethyl ether, to form an intermediate monochlorophosphate product. This intermediate product is thereafter reacted portionwise with a diethyl ether solution of at least 1 molecular proportion of propargyl alcohol and at least 1 molecular proportion of triethylamine. The conditions of reaction and the separation of the desired product are as have been previously described.

The following examples illustrate the invention but are not to be construed as limiting.

EXAMPLE 1

*O,O-dipropynyl O-2,4,5-trichlorophenylphosphate*

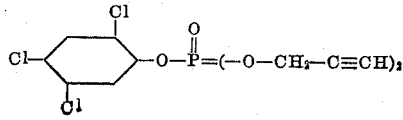

23 grams (0.41 mole) of propargyl alcohol and 42 grams (0.415 mole) of triethylamine was dissolved in 100 milliliters of diethyl ether and the resulting mixture added portionwise with stirring to 63 grams (0.41 mole) of 2,4,5-trichlorophenyl dichlorophosphate (boiling at 140°–150° C. at 2 millimeters pressure and having a density of 1.6790 and a refractive index n/D of 1.5679 at 20° C.) dissolved in 900 milliliters of diethyl ether. During the addition, the temperature of the reaction mixture rose to 35° C. The mixture was then set aside overnight at room temperature and thereafter filtered and the solvent recovered from the filtrate by fractional distillation under reduced pressure to obtain an O,O-dipropynyl O-2,4,5-trichlorophenylphosphate product as a residue. The latter was an oily liquid having a density of 1.4058 and a refractive index n/D of 1.5370 at 20° C.

EXAMPLE 2

*O,O-dipropynyl O-2,4,5-trichlorophenoxyethylphosphate*

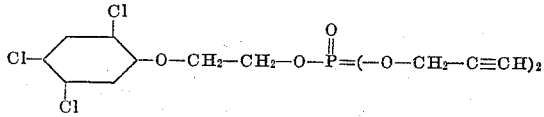

48 grams (0.2 mole) of 2,4,5-trichlorophenoxyethanol and 21.5 grams (0.21 mole) of triethylamine were dissolved in 1000 milliliters of diethyl ether and the resulting solution added portionwise with stirring to 30.5 grams (0.2 mole) of phosphorus oxychloride dissolved in 200 milliliters of diethyl ether, to prepare an O-2,4,5-trichlorophenoxyethyl dichlorophosphate starting material. During the addition, the temperature of the reaction mixture rose to 35° C. Following the addition, the mixture was set aside at room temperature for about 4 hours to complete the reaction.

23 grams (0.41 mole) of propargyl alcohol and 42 grams (0.413 mole) of triethylamine was dissolved in 100 milliliters of diethyl ether and added portionwise to the above prepared O-2,4,5-trichlorophenoxyethyl dichlorophosphate product. During the addition, which was carried out with stirring, the temperature of the reaction mixture rose to 35° C. Following the addition, the mixture was set aside overnight at room temperature and thereafter filtered and the solvent recovered from the filtrate by fractional distillation under reduced pressure to obtain an O,O-dipropynyl O-2,4,5-trichlorophenoxyethylphosphate product. The latter was an oily liquid having a density of 1.4144 and a refractive index n/D of 1.5145 at 20° C.

EXAMPLE 3

*O-propynyl O-ethyl O-2,4,5-trichlorophenylthiophosphate*

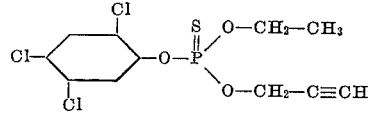

9.5 grams (0.026 mole) of ethanol and 21.3 grams (0.21 mole) of triethylamine was dissolved in 700 milliliters of diethyl ether and the resulting mixture added portionwise with stirring to 66 grams (0.2 mole) of O-2,4,5-trichlorophenyl dichlorothiophosphate (boiling at 110° C. at 1 milliliter pressure and having a density of 1.6653 and a refractive index n/D of 1.6084 at 20° C.) dissolved in 200 milliliters of dithyl ether, to prepare an O-ethyl O-2,4,5-trichlorophenyl chlorothiophosphate intermediate. During the addition, the temperature of the reaction mixture rose to 35° C. Following the addition, the mixture was set aside at room temperature for about 20 hours to complete the reaction.

11.5 grams (0.205 mole) of propargyl alcohol and 21.3 grams (0.21 mole) of triethylamine was dissolved in 100 milliliters of diethyl ether and added portionwise with stirring at a temperature of from 20° to 35° C. to the above monochlorothiophosphate intermediate. The addition was carried out with stirring and the reaction mixture thereafter set aside at room temperature for about 16 hours. The mixture was then filtered and the solvent recovered from the filtrate by fractional distillation under reduced pressure to obtain an O-propynyl O-ethyl O-2,4,5-trichlorophenylthiophosphate product. The latter was an oily liquid having a density of 1.3754 and a refractive index $n/D$ of 1.5585 at 20° C.

The new propynyl phosphate products have been found effective as parasiticides. For such use, the products may be dispersed on a finely divided solid and employed as a dust. Also, such mixtures may be dispersed in water with the aid of a wetting agent and the resulting aqueous suspensions employed as sprays. In other procedures, the products may be employed in oil, as constituents of oil-in-water emulsions or in water dispersions with or without the addition of wetting, dispersing or emulsifying agents.

The products of the preceding examples have been tested for the control of two-spotted spider mites and bean aphids. In a representative operation against these organisms, 100 percent kills were obtained with aqueous spray compositions containing 3 pounds of the O,O-dipropynyl O-2,4,5-trichlorophenoxyethylphosphate product of Example 2 per 100 gallons of spray mixture.

The dichlorophosphates of the formula

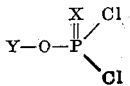

which are employed as a starting materials as previously described may be prepared by reacting phosphorus oxychloride or phosphorus thiochloride with 2,4,5-trichlorophenol or 2,4,5-trichlorophenoxyethanol. The reaction is carried out in the presence of a hydrogen chloride acceptor such as pyridine or triethylamine. Good results are obtained when employing from 1 to 4 moles of the phosphorus oxychloride or phosphorus thiochloride per mole of the phenol or ethanol reagent. In carrying out the reaction, the phenol or ethanol and hydrogen chloride acceptor are dissolved in an organic solvent such as diethyl ether and the resulting solution added portionwise with stirring to the phosphorus thiochloride or phosphorus oxychloride dissolved in the same solvent. Following the addition, the mixture is warmed for a short period of time to complete the reaction. The crude mixture is then filtered and the filtrate fractionally distilled under reduced pressure to separate the desired product.

I claim:

1. A compound of the formula $$CH\equiv C-CH_2-O-P\underset{O-Z}{\overset{X}{\overset{\|}{\diagup}}}O-Y$$

wherein X is a member of the group consisting of oxygen and sulfur, Y is a member of the group consisting of 2,4,5-trichlorophenyl and 2,4,5-trichlorophenoxyethyl and Z is a member of the group consisting of propynyl and ethyl.

2. O,O-dipropynyl O-2,4,5-trichlorophenylphosphate.

3. O,O-dipropynyl O-2,4,5-trichlorophenoxyethylphosphate.

4. O-propynyl O-ethyl O-2,4,5-trichlorophenylthiophosphate.

References Cited in the file of this patent

UNITED STATES PATENTS

| Number | Name | Date |
|---|---|---|
| 2,176,416 | Britton et al. | Oct. 17, 1939 |
| 2,599,515 | Moyle | June 3, 1952 |
| 2,599,516 | Moyle | June 3, 1952 |